United States Patent
Sohre et al.

(10) Patent No.: US 10,776,957 B2
(45) Date of Patent: Sep. 15, 2020

(54) ONLINE IMAGE COMPRESSION IN HARDWARE

(71) Applicant: Samsung Electronics Co., Ltd., Suwon-si, Gyeonggi-do (KR)

(72) Inventors: Nicholas Sohre, Saint Paul, MN (US); Abhinav Golas, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/252,386

(22) Filed: Jan. 18, 2019

(65) Prior Publication Data

US 2020/0105021 A1  Apr. 2, 2020

Related U.S. Application Data

(60) Provisional application No. 62/740,166, filed on Oct. 2, 2018.

(51) Int. Cl.
  *G06T 9/00* (2006.01)
  *G06T 1/60* (2006.01)
  *G06T 1/20* (2006.01)

(52) U.S. Cl.
  CPC ............ *G06T 9/00* (2013.01); *G06T 1/20* (2013.01); *G06T 1/60* (2013.01)

(58) Field of Classification Search
  CPC ............... G06T 9/00; G06T 1/20; G06T 1/60
  See application file for complete search history.

(56) References Cited

U.S. PATENT DOCUMENTS

| 5,539,468 A | 7/1996 | Suzuki et al. |
| 6,137,914 A | 10/2000 | Ligtenberg et al. |

(Continued)

FOREIGN PATENT DOCUMENTS

| WO | WO 2013/003819 A1 | 1/2013 |
| WO | WO 2013/063638 A2 | 5/2013 |
| WO | WO 2015/131330 A1 | 9/2015 |

OTHER PUBLICATIONS

Portable Network Graphics; https://en.wikipedia.org/wiki/Portable Network Graphic#filtering, 12 pages.

(Continued)

*Primary Examiner* — Nicholas R Wilson
(74) *Attorney, Agent, or Firm* — Lewis Roca Rothgerber Christie LLP (57) ABSTRACT

A method of variable rate compression including: partitioning the image data into a plurality of blocks, each including channel-blocks; and for one of the one or more non-flat channel-blocks: generating a residual block including residual values corresponding to values of the one of the one or more non-flat blocks; in response to determining that a particular residual value of the residual values is equal to a corresponding previous residual value: incrementing a run counter; and in response to determining that the run counter is greater than a threshold, generating a run-mode flag and writing the run-mode flag after the particular residual value in a compressed output stream; and in response to determining that the particular residual value is not equal to a corresponding previous value: in response to determining that the run counter is greater than the threshold, generating a run-length after the run-mode flag in the compressed output stream.

24 Claims, 4 Drawing Sheets

(56) References Cited

U.S. PATENT DOCUMENTS

| | | |
|---|---|---|
| 6,243,416 B1 | 6/2001 | Matsushiro et al. |
| 6,668,086 B1 | 12/2003 | Enokida |
| 6,819,793 B1 | 11/2004 | Reshetov et al. |
| 7,202,912 B2 | 4/2007 | Aneja et al. |
| 7,236,636 B2 | 6/2007 | Sakai et al. |
| 7,321,693 B2 | 1/2008 | Kadowaki |
| 7,576,888 B2 | 8/2009 | Sakai et al. |
| 7,750,938 B2 | 7/2010 | Grimes et al. |
| 8,300,956 B2 | 10/2012 | Luttmer et al. |
| 8,452,083 B2 | 5/2013 | Kambegawa |
| 8,478,057 B1 | 7/2013 | Cui et al. |
| 8,509,532 B2 | 8/2013 | Ushiku |
| 8,533,166 B1 | 9/2013 | Sulieman et al. |
| 8,553,301 B2 | 10/2013 | Tamura |
| 8,659,793 B2 | 2/2014 | Takeishi |
| 8,660,347 B2 | 2/2014 | Tamura |
| 8,977,066 B2 | 3/2015 | Alakuijala |
| 9,378,560 B2 | 6/2016 | Iourcha et al. |
| 2008/0317362 A1 | 12/2008 | Hosaki et al. |
| 2009/0148059 A1 | 6/2009 | Matsuda |
| 2011/0069076 A1 | 3/2011 | Lindholm et al. |
| 2011/0148894 A1 | 6/2011 | Duprat et al. |
| 2011/0188750 A1 | 8/2011 | Tamura |
| 2011/0243469 A1 | 10/2011 | McAllister et al. |
| 2012/0320067 A1 | 12/2012 | Iourcha et al. |
| 2013/0170558 A1 | 7/2013 | Zhang |
| 2014/0219573 A1* | 8/2014 | Teng .................. H04N 19/94 382/232 |
| 2017/0213107 A1 | 7/2017 | Gervais et al. |
| 2017/0256024 A1 | 9/2017 | Abraham et al. |

OTHER PUBLICATIONS

Lossless JPEG; https://en.wikipedia.org/wiki/Lossles_JPEG#LOCO-1_algorithm, 6 pages.

Geometric Distribution; https://en.wikipedia.org/wiki/Geometric distribution, 7 pages.

3.1.8.1.3 Color Conversion 9RGB to YCbCr), Feb. 14, 2019.

* cited by examiner

ONLINE IMAGE COMPRESSION IN HARDWARE

CROSS-REFERENCE TO RELATED APPLICATION(S)

This application claims priority to, and the benefit of, U.S. Provisional Application No. 62/740,166 ("LOSSLESS ONLINE IMAGE COMPRESSION FOR GPUS"), filed on Oct. 2, 2018, the entire content of which is incorporated herein by reference.

This application is related to U.S. Pat. No. 10,115,177 ("ONLINE TEXTURE COMPRESSION AND DECOMPRESSION IN HARDWARE"), issued on Oct. 30, 2018, which claims priority to, and the benefit of, U.S. Provisional Application No. 62/412,026 filed on Oct. 24, 2016, and U.S. Provisional Application No. 62/018,178 filed Jun. 27, 2014, the entire contents of which are incorporated herein by reference.

This application is also related to U.S. Pat. No. 9,947,071 ("TEXTURE PIPELINE WITH ONLINE VARIABLE RATE DICTIONARY COMPRESSION"), issued on Apr. 17, 2018, which claims priority to, and the benefit of, U.S. Provisional Application No. 62/018,178 filed Jun. 27, 2014, the entire contents of which are incorporated herein by reference.

FIELD

Aspects of embodiments of the present disclosure are generally related to a graphics processing unit (GPU). In particular, the present disclosure is related to online texture compression and decompression in hardware.

BACKGROUND

Texture mapping in a graphics processing unit (GPU) is responsible for adding detail to a computer generated graphics model. The process involves fetching actual color values and filtering them to produce the color for every pixel in the model. Texturing is a critical design component for 3D rendering performance and incurs a significant fraction of total processor power and memory. In typical GPUs, the color values are fetched from memory before further filtering. Memory access due to texturing contributes to memory bandwidth and memory power and is a major source of performance bottlenecks.

With the advent of deferred rendering approaches, memory usage has only increased. In a deferred rendering pipeline, all relevant material properties of objects in a scene are transferred from scene geometry onto multiple images. Lighting and all subsequent rendering and lighting calculations are then performed on a per-pixel level in post-processing stages, which consume these intermediate images, collectively known as the G(eometry)-buffer, and create the output image displayed on the screen. These images, and intermediate image traffic, constitute the primary consumer of memory bandwidth and a key limiter of rendering performance. For example, most images on current generation screens are rendered at 1080p with 32 bits per pixel—which by itself constitutes 8 MB of data and is expected to be rendered 30-60 times a second—requiring 240-480 MB per second of bandwidth just for the final image. The bandwidth constraints become even more severe with 4K resolution screens, which are gaining in popularity in consumer products.

As a result, reducing or eliminating memory accesses due to texturing is an important GPU design constraint.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system capable of improving rendering performance while lowering energy consumption by compressing images during the rendering process. Some embodiments of the disclosure perform lossless compression, so as to not compromise the rendered result, and to ensure that the compressions and decompression remain transparent to the end user and applications.

Aspects of embodiments of the present disclosure are directed to a system and method for leveraging a combination of image compression techniques to improve compression and reduce GPU texture and/or memory bandwidth usage over techniques of the related art. In some embodiments, the system and method employ several processes for reducing redundancy in data representing an image (e.g., a texture) and encoding remaining data as close to entropy as practicable.

According to some embodiments of the present disclosure, there is provided a method of variable rate compression of image data in an image pipeline of a graphics processing system, the method including: partitioning, by a processor of the graphics processing system, the image data into a plurality of blocks, each block of the plurality of blocks including a plurality of channel-blocks corresponding to color channels of a color space of the block; identifying, by the processor, one or more non-flat channel-blocks of the plurality of channel-blocks; and for one of the one or more non-flat channel-blocks: generating, by the processor, a residual block including residual values corresponding to values of the one of the one or more non-flat blocks; determining, by the processor, whether each of the residual values is equal to a previous residual value or not; in response to determining that a particular residual value of the residual values is equal to a corresponding previous residual value: incrementing a run counter; and in response to determining that the run counter is greater than a threshold, generating, by the processor, a run-mode flag and writing the run-mode flag after the particular residual value in a compressed output stream; and in response to determining that the particular residual value is not equal to a corresponding previous value: in response to determining that the run counter is greater than the threshold, generating, by the processor, a run-length after the run-mode flag in the compressed output stream, the run-length corresponding to the run counter; and encoding, by the processor, the write stream to generate a compressed channel-block.

In some embodiments, the threshold is two.

In some embodiments, the run-length is equal to the run counter or a quantized value corresponding to the run counter.

In some embodiments, the plurality of blocks includes aligned blocks, each of the blocks including a k×l block of pixels of the image data, where k and l are integers greater than 1.

In some embodiments, the method further includes transforming, by the processor, a color space of each block of the plurality of blocks to a target color space.

In some embodiments, the color space of each block of the plurality of blocks is an RGB (red, green, and blue) color space, and the target color space is a YCbCr (luma component 'Y', blue-difference chroma component 'Cb', and red-difference chroma component 'Cr') color space, and the plurality of channel-blocks includes a first channel-block corresponding to a Y color channel, a second channel-block corresponding to a Cb color channel, and a third channel-block corresponding to a Cr color channel.

In some embodiments, each of the one or more non-flat channel-blocks includes at least two pixels with different color values.

In some embodiments, the generating the residual block includes: determining, by the processor, prediction values for the values of the one of the one or more non-flat channel-blocks using a prediction method; and determining, by the processor, residual values based on the prediction values and the values of the one of the one or more non-flat channel-blocks to generate the residual block.

In some embodiments, the prediction method includes an average prediction method, a differential pulse-code modulation (DPCM) method, or a low complexity lossless compression (LOCO-I) prediction method.

In some embodiments, the run-mode flag is a binary value indicating that the run counter exceeds the threshold.

In some embodiments, the method further includes: comparing, by the processor, a size of the compressed channel-block with a size of the one of the one or more non-flat channel-blocks; and in response to determining that the size of the compressed channel-block is equal to or greater than the size of the one of the one or more non-flat channel-blocks, updating, by the processor, a metadata associated with the one of the one or more non-flat channel-blocks to indicate that the one of the one or more non-flat channel-blocks is uncompressible.

In some embodiments, the method further includes: identifying, by the processor, one or more flat channel-blocks of the plurality of channel-blocks, each of the one or more flat channel-blocks including pixels having a same color value; and compressing, by the processor, the one or more flat channel-blocks by storing the color value of each of the one or more flat channel-blocks in an associated metadata.

In some embodiments, the method further includes: identifying, by the processor, a plurality of duplicate channel-blocks of the plurality of channel-blocks, the plurality of duplicate channel-blocks including a first duplicate channel-block; and compressing, by the processor, the duplicate channel-blocks by storing a pointer to the first duplicate channel-block in metadata associated with ones of the duplicate channel-blocks other than the first duplicate channel-block.

In some embodiments, the identifying the plurality of duplicate channel-blocks includes: maintaining, by the processor, a sliding window of channel-blocks of the plurality of channel-blocks; and comparing, by the processor, one of the plurality of channel-blocks with ones of the sliding window of channel-blocks to identify a match.

In some embodiments, the encoding the write stream includes encoding the write stream with arithmetic encoding, huffman encoding, or golomb encoding to generate the compressed channel-block.

According to some embodiments of the present disclosure, there is provided a graphics processing system for variable rate compression of image data in an image pipeline, the system including: a processor; and a processor memory local to the processor, wherein the processor memory has stored thereon instructions that, when executed by the processor, cause the processor to perform: partitioning the image data into a plurality of blocks, each block of the plurality of blocks including a plurality of channel-blocks corresponding to color channels of a color space of the block; identifying one or more non-flat channel-blocks of the plurality of channel-blocks; and for one of the one or more non-flat channel-blocks: generating a residual block including residual values corresponding to values of the one of the one or more non-flat blocks; determining whether each of the residual values is equal to a previous residual value or not; in response to determining that a particular residual value of the residual values is equal to a corresponding previous residual value: incrementing a run counter; and in response to determining that the run counter is greater than a threshold, generating a run-mode flag and writing the run-mode flag after the particular residual value in a compressed output stream; and in response to determining that the particular residual value is not equal to a corresponding previous value: in response to determining that the run counter is greater than the threshold, generating writing a run-length after the run-mode flag in the compressed output stream, the run-length corresponding to the run counter; and encoding the write stream to generate a compressed channel-block.

According to some embodiments of the present disclosure, there is provided a method of variable rate compression of image data in an image pipeline of a graphics processing system, the method including: partitioning, by a processor of the graphics processing system, the image data into a plurality of blocks, each block of the plurality of blocks including a plurality of channel-blocks corresponding to color channels of a color space of the block; identifying, by the processor, one or more non-flat channel-blocks of the plurality of channel-blocks, one of the one or more non-flat channel-blocks including a plurality of values; and for the one of the one or more non-flat channel-blocks: determining, by the processor, whether each one of the plurality of values is equal to a previous value of the plurality of values or not; in response to determining that a particular value of the plurality of values is equal to a corresponding previous value: incrementing a run counter; and in response to determining that the run counter is greater than a threshold, generating, by the processor, a run-mode flag and writing the run-mode flag after the particular value in a compressed output stream; and in response to determining that the particular value is not equal to a corresponding previous value: in response to determining that the run counter is greater than the threshold, generating, by the processor, a run-length after the run-mode flag in the compressed output stream, the run-length corresponding to the run counter; and generating, by the processor, a residual block including residual values corresponding to values of the write stream; encoding, by the processor, the residual block to generate a compressed channel-block.

According to some embodiments of the present disclosure, there is provided a method of variable rate decompression of image data in an image pipeline of a graphics processing system, the method including: retrieving, by a processor of the graphics processing system, a stored channel-block associated with the image data; identifying, by the processor, the stored channel-block as compressed, uncompressed, or flat; and in response to identifying the stored channel-block as compressed: decoding, by the processor, the stored channel-block according to an encoding scheme to generate a residual block including residual values; determining, by the processor, whether each of the residual values is equal to a plurality of previous residual values or not; and in response to determining that a particular residual value of the residual values is equal to the plurality of previous residual values: identifying, by the processor, a run-mode flag associated with the particular original value; and in response to determining that the run-mode flag is true: retrieving, by the processor, a run length; and copying, by the processor, one of the plurality of previous original values into a number of values in a write stream following the corresponding previous original value, the number of values corresponding to the run length, the write stream including a plurality of run-length decoded residual values; and generating, by the processor, an uncompressed channel-block associated with the image data based on the write stream.

In some embodiments, the method further includes: determining, by the processor, predicted values based on the run-length decoded residual values according to a prediction scheme; and determining original values based on the predicted values and the residual values, wherein the generating the uncompressed channel-block is based on the original values.

In some embodiments, the stored channel-block includes color values of a channel of a k×l block of pixels of the image data, where k and l are integers greater than 1, and the plurality of previous residual values includes two or more previous residual values.

In some embodiments, the encoding scheme includes arithmetic encoding, huffman encoding, or golomb encoding.

In some embodiments, the prediction scheme includes an average prediction method, a differential pulse-code modulation (DPCM) method, or a low complexity lossless compression (LOCO-I) prediction method.

In some embodiments, the run-mode flag is a binary value indicating that the run counter exceeds the threshold.

In some embodiments, the method further includes transforming, by the processor, a color space of the uncompressed channel-block a target color space.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for defect detection, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the foregoing, a "symbol" refers to a value to be encoded by an encoding algorithm. According to some examples, a symbol refers to the 8-bit value of a single channel component of a pixel. A "block" refers to a rectangular unit of subdivision for texture compression. According to some embodiments, blocks of an image/texture are compressed independently. In some embodiments, the data pertaining to different channels of a block (also referred channel-blocks) is compressed independently. A "signal" refers to a sequence of discrete values (e.g., a sequence of '1's and '0's) emanating from a source. Additionally, "entropy" refers to the theoretical minimum bits per symbol required to encode a signal.

Generally speaking, embodiments of the present disclosure are directed to a compression system and method providing variable rate, lossless compression (e.g., variable rate, lossless compression) of image data and decompression of compressed data in a graphics system. The compression involves generating metadata associated with, and identifying, the compressed data, which the decompressor may utilize to properly decode the compressed data into a lossless representation of the original image data. As the combined memory footprint of the compressed data and associated metadata is smaller than the actual uncompressed image data, embodiments of the present disclosure may provide substantial bandwidth savings in transmitting image data in a system, such as a graphics processing unit (GPU), a system on chip (SoC), and/or the like.

Figure 1:
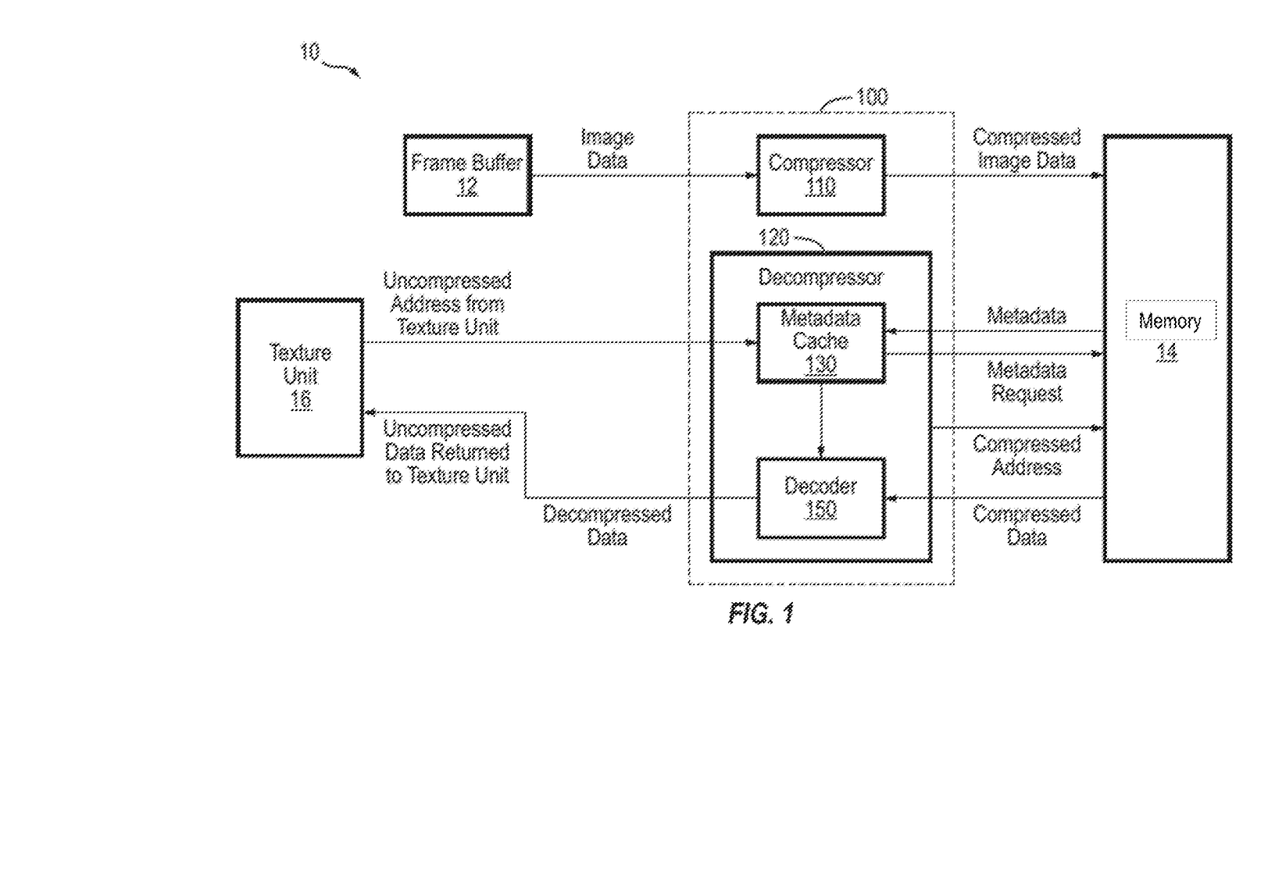
FIG. 1 is a block diagram illustrating variable rate compression and decompression of a compression system in a graphics processing system, according to some example embodiments of the present disclosure.

FIG. 1 is a block diagram illustrating variable-rate, lossless compression and decompression of the compression system 100 in a graphics processing system 10 according to some example embodiments of the present disclosure.

In some examples, the graphics processing system 10 may be implemented as part of a larger graphics pipeline in a GPU or a SoC having processors, on-chip memory, and an image pipeline. Referring to FIG. 1, the compression system 100 includes a compressor (e.g., a variable rate compressor) 110 and a decompressor (e.g., a variable rate decompressor) 120 for respectively performing compression and decompression in a graphics system having a frame buffer 12 (also referred to as tile buffer) that outputs image data to the compression system 100, a memory (e.g., an on-chip L2 cache) 14 to, for example, minimize or reduce a need to access off-chip memory, and a texture unit 16 for receiving the image data.

In some embodiments, the compressor 110 supports different compression lengths for different types of data. The compressed image data generated by the compressor 110 may be stored in the memory cache 14. Additionally, the compressor 110 generates metadata to assist in address mapping during decompression. The decompressor 120 includes a metadata cache 130 and a decoder 150. The metadata cache 130 is populated with metadata via metadata requests to the memory cache 104, as illustrated by the arrows in FIG. 1. The metadata is cached so that metadata may be reused multiple times for each fetch. This may serve to increase the bandwidth benefits. Image data generally has a high degree of spatial locality. As a result, a cache line of metadata may be initially accessed followed by one or more data cache lines of compressed data from the memory cache as needed.

The compressed data may be accessed from the memory cache 104 and provided to the decoder 150. According to some embodiments, the decoder 150 supports different types of decoding based on different compression types and thus may also be considered as having several different decoders. A pass-through path may be provided for uncompressed data. Once the compressed data is received, it is sent to the appropriate decoder depending on the compression type, which may be indicated by a number of bits in the metadata. For example, a 3-bit code may be used to indicate 7 different compression types and an uncompressed data type. More generally, an arbitrary number of different compression types may be supported.

When the texture unit 16 requests image data by sending an address associated with the image data to the decompressor 120, the decompressor 120 looks up the address in the metadata cache 130 (e.g., via a header table or other data structure) to find the compressed memory address in the memory cache 14.

As noted above, the compression methods employed by the compression system 100 are variable-rate and, in some embodiments, lossless. As a result, in some embodiments, an additional set of metadata is utilized to define the kind of compression used for each block, and the corresponding size of the compressed block. According to some embodiments, to reduce metadata overhead, a metadata entry is defined for a set of spatially coherent blocks (e.g., a set of 6, 8, or 16 contiguous blocks), rather than being defined for each individual block. This spatially coherent set of blocks, which represents a rectangular set of pixels, makes up a metadata entries. The metadata entry stores information on how each of the child blocks (i.e., the blocks corresponding to the metadata entry) is compressed and the compressed size of each block. Increasing the number of blocks per metadata entry may reduce the metadata overhead; however, increasing the number of blocks beyond a certain point may come at the cost of compression, so a balance may be struck between compression and metadata overhead depending on the requirements of a particular implementation.

Each metadata entry may be stored in the cache 14, and accessed by the decompressor 120 via the metadata cache 130.

Figure 2:
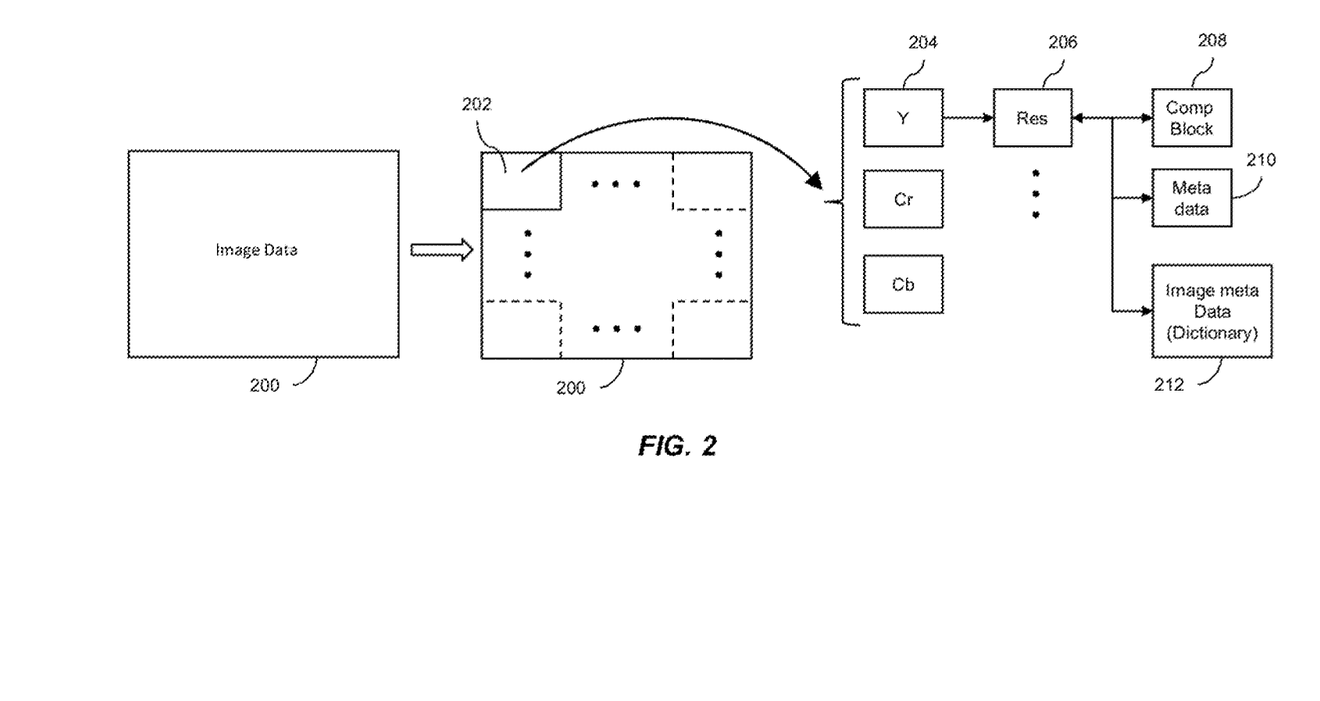
FIG. 2 illustrates a relation between uncompressed image data, blocks, and channel-blocks, according to some example embodiments of the present disclosure.

FIG. 2 illustrates a relation between uncompressed image data 200, blocks 202, and channel-blocks 204, according to some example embodiments of the present disclosure.

Referring to FIG. 2, the compressor 110 organizes the uncompressed image data (e.g., texture or pixel data) 200 it receives from the frame buffer 12 into a set of blocks 202. According to some embodiments, the compressor 110 partitions (e.g., sub-dividing) the uncompressed image data 200 into the aligned blocks 200 of the same size (e.g., of k*l pixels each, where k and l are integers greater than 1). In some examples, each individual block 202 corresponds to an array (e.g., matrix) of pixel color values having a pre-selected size of k×l (where and l are integers, at least one of which is greater than 1), such as a 2×2, 4×4, 8×8, or 16×16 array.

For the purposes of illustrating aspects of the present disclosure, each element in the array of values in a block will be described as a pixel or texel having color data, but it will be understood that, more generally, other types of data could be represented by the texture data, such as depth data, normals, reflection maps, and/or the like. In computer graphics, a texel (texture element) is the smallest graphical element in two-dimensional (2-D) texture mapping to create the impression of a textured surface. A texel is similar to a pixel (picture element) because it represents an elementary unit in a graphics pipeline. Each texel may have one color value, which may be represented by one or more channels (e.g., red, green, blue, alpha channels). Additionally, more generally, a texture can be considered to be an array of data and may include color data, luminance data, stencil data, or other types of data.

The compressor 110 may then transform the color space of each block 202 into the YUV (luma component 'Y', blue-difference chroma component 'U', and red-difference chroma component 'V') color space. An example of the YUV color space may be YCbCr (luma component 'Y', blue-difference chroma component 'Cb', and red-difference chroma component 'Cr') color space. The compressor 110 then may represent each channel (e.g., color channel) of the block 202 with a channel-block 204. In some examples, each block 202 corresponds to (e.g., is represented with) a Y channel-block 204, a Cr channel-block 204, and a Cb channel-block 204. According to some embodiments, the compressor 110 then factors out flat blocks (and in some embodiments, duplicates). However, embodiments of the present invention are not limited thereto, and in some examples, the compressor 110 detects flat and duplicate blocks before performing any color space transformation. In some embodiments, the compressor 110 uses a prediction method to produce a residual for each of the values in the channel-blocks 204 and to generate a residual block 206 including all of the residual values corresponding to the channel-block 204. In some embodiments, the compressor 110 then performs a modified run-length encoding (RLE) process to reduce overhead: instead of storing a run flag for every residual to indicate whether or not a run has started, a run is indicated by the presence of two sequential identical residuals. Then a run flag indicates whether or not the run continues, followed by a run-length. Once runs have been removed, the compressor 110 entropy codes the rest of the residuals using a set or predetermined method (such as Huffman or Arithmetic coding) to generate the compressed channel-block 208. In some embodiments, the compressor 110 stores a block type flag in the associated metadata (e.g., block metadata 210), which indicates the type of the compressed channel-block data 208 as compressed. The compressor 110 may also store an offset/pointer to where the compressed data is written so as to allow random access to the compressed data. That is, the pointer allows for arbitrary packing of compressed data, while the metadata entries remain in a linear order of blocks.

The dictionary 212 may be a Huffman dictionary that maps input residuals to a dictionary entry. Each entry in the dictionary may include a residual value that occurs reasonably often in the input stream (after previous steps). In some embodiments the dictionary may be static/fixed and dictionary entries are consumed during the compression process. In other embodiments, the dictionary may be updated in an on-line fashion (e.g., in real-time) based on a running histogram of residual values from queries to the dictionary.

Figure 3:
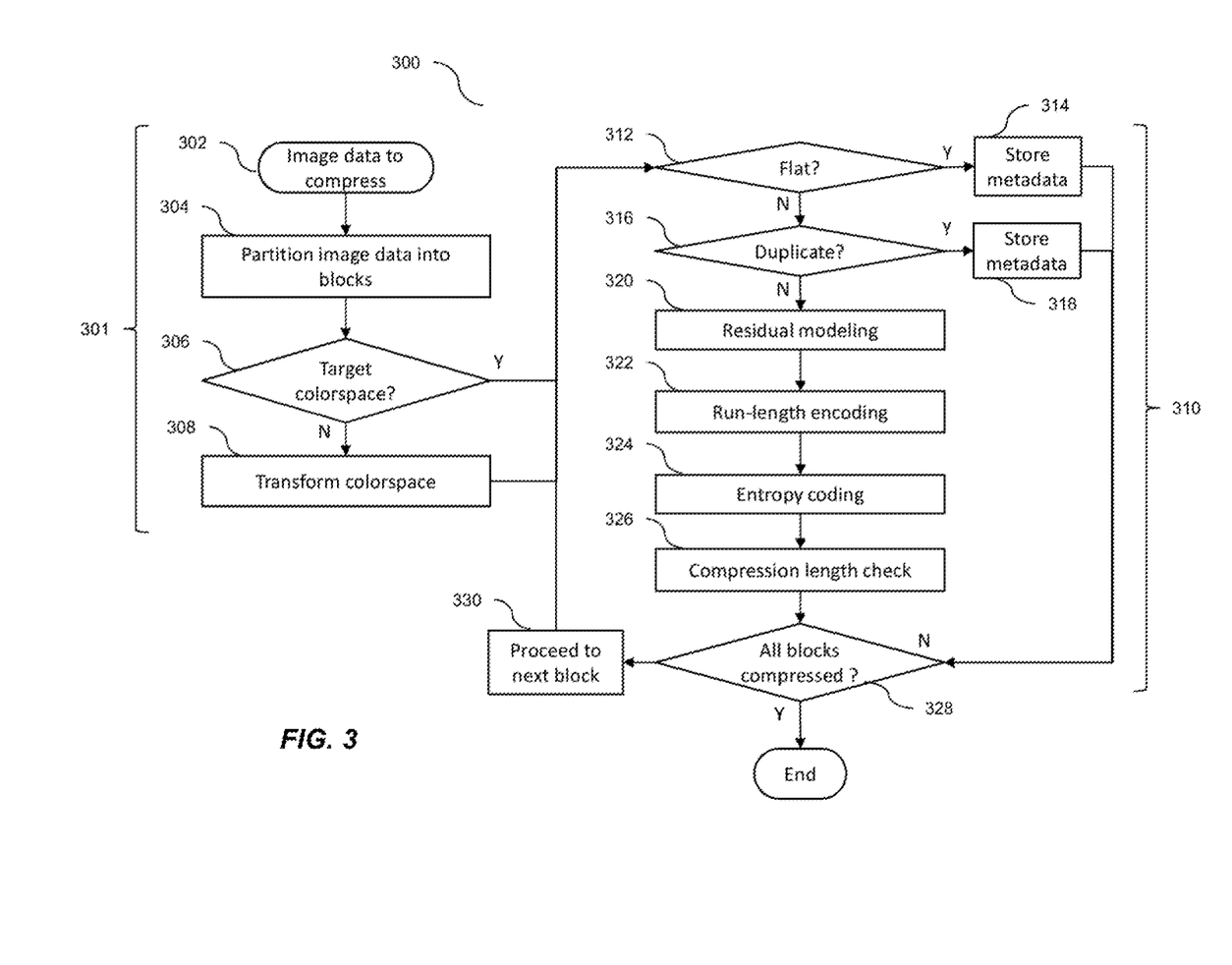
FIG. 3 is a flow diagram illustrating a process of variable rate compression of image data in an image pipeline of the graphics processing system, according to some example embodiments of the present disclosure.

FIG. 3 is a flow diagram illustrating a process 300 of variable rate compression of image data 200 in an image pipeline of the graphics processing system 10, according to some example embodiments of the present disclosure.

In some embodiments, the compressor 110 performs image preprocessing (S302) on the image data 200 received from the frame buffer 12. According to some embodiments, the compressor 110 partitions (S304) the image data 200 received from the frame buffer 12 into aligned blocks 202 of k*l pixels (where k and l are integers greater than 1). In some embodiments, each block 202 includes k*k pixels, where k is, for example, 4, 8, or 16. In some examples, if the dimensions (in pixels) of the image data 200 are not divisible by k and/or l, the compressor 110 may perform zero-padding so that all partitioned blocks 202 are k*l pixels.

In some embodiments, the compressor 110 determines if the color space of the image data 200 is the same as the target color space (S306) and if not, transforms the color space to the target color space (S308). In some examples, the original color space of the image data 200 may be RGB (red, green, blue), and the target (or desired) color space may be YUV (luma component 'Y', blue-difference chroma component 'U', and red-difference chroma component 'V') or YCbCr (luma component 'Y', blue-difference chroma component 'Cb', and red-difference chroma component 'Cr'). The RGB color space may have high correlation between channel components. Converting to a YUV or YCrCb color space may reduce inter-channel correlation (e.g., decorrelate, or reduce the correlation between, the Y channel and the Cr and Cb channels), but increase the spatial correlation within each channel. As, according to some embodiments, each channel is separately (e.g., independently) compressed, increasing spatial correlation in each channel may lead to greater overall compression of the image data 200. The RGB to YCbCr transformation is also reversible, so that the decompressor 120 can recover the original RGB color space by applying the inverse transformation.

While FIG. 3 illustrates the partitioning (S304) being performed before the color space transformation (S306 and S308), embodiments of the present disclosure are not limited thereto. For example, the color space conversion may be performed on the image data 200 prior to partitioning the image data 200 into a plurality of blocks 202.

After preprocessing the image data 200, the compressor 110 proceeds to compress each of the plurality of blocks 202 (S310). According to some embodiments, each block 202 includes three channel-blocks 204 representing each of the three channels of the color space (e.g., Y, Cb, and Cr), the compression (S310) is performed on each of the channel-blocks 204. Because, in the compression (S310) performed by the compressor 110, each channel is treated independently, the compressor 110 may compress the three channel-blocks 204 of each block 202 in parallel, which can greatly improve (e.g., increase) compression speeds in a multi-processor/core system.

According to some embodiments, for each channel-block 204, the compressor 110 first checks if the channel-block 204 is a flat (i.e., constant) block or a non-flat (S312) block. A flat block is one that includes all identical values. Each value in a channel-block 204 represents the channel intensity for a corresponding pixel within the block 202. The compressor 110 determines whether a channel-block 204 is flat or not based on a comparison operation (e.g., bit-level or bit-by-bit comparison operation). In the example of the bitwise XOR operation, when the binary values of all pixels within the channel-block 204 are the same, the bitwise XOR operation produces an output of all 0s. In such a case, the compressor 110 determines that the channel-block 204 is a flat or constant block. When the result of the XOR operation contains any non-zero value, the compressor 110 determines that the channel-block 204 is not flat. The compression saving may be great for a flat/constant block as all the information needed to reconstruct the entire block 202 may be stored in the metadata for the block 202, pre-empting a memory fetch. Thus, in some embodiments, when a channel-block 204 is determined as being flat/constant, the compressor 110 stores the value (e.g., color value) of the flat block in an associated metadata (S314) and skips to the next channel-block 204 (S328). In some examples, the compressor 110 may label the block as a flat/constant type by, for example, appropriately setting a block type flag in the corresponding metadata (e.g., block metadata 210).

In some embodiments, when the channel-block 204 is not flat/constant, the compressor 110 proceeds to determine if the channel-block 204 is a duplicate/clone of a previous channel-block 204 or not (S316). Similar to flat blocks, duplicate blocks can also be found in image data 200 (e.g., textures). For blocks 202 having duplicates, once the first instance of a clone block is encountered, all subsequent instances may point back to the first. Thus, according to some embodiments, the compressor 110 generates/updates the metadata associated with the duplicate/clone block to back-reference the first instance of such channel-block 204 (S318). In some examples, the compressor 110 may label the block as a duplicate type by, for example, appropriately setting a block type flag in the corresponding metadata (e.g., block metadata 210).

In some examples, achieving the maximum compression benefits from duplicate block factoring may be memory intensive, as it involves storing every unique channel-block 204 encountered as the image data 200 is read and comparing every subsequent channel-block 204 to them. Thus, in some embodiments, the compression system 100 keeps a sliding window of channel-blocks 204 and allows future blocks 202 to back-reference anything in the window (e.g., storing "block p is a repeat of block p–q" in metadata where q is within a set window length).

Figure 4:
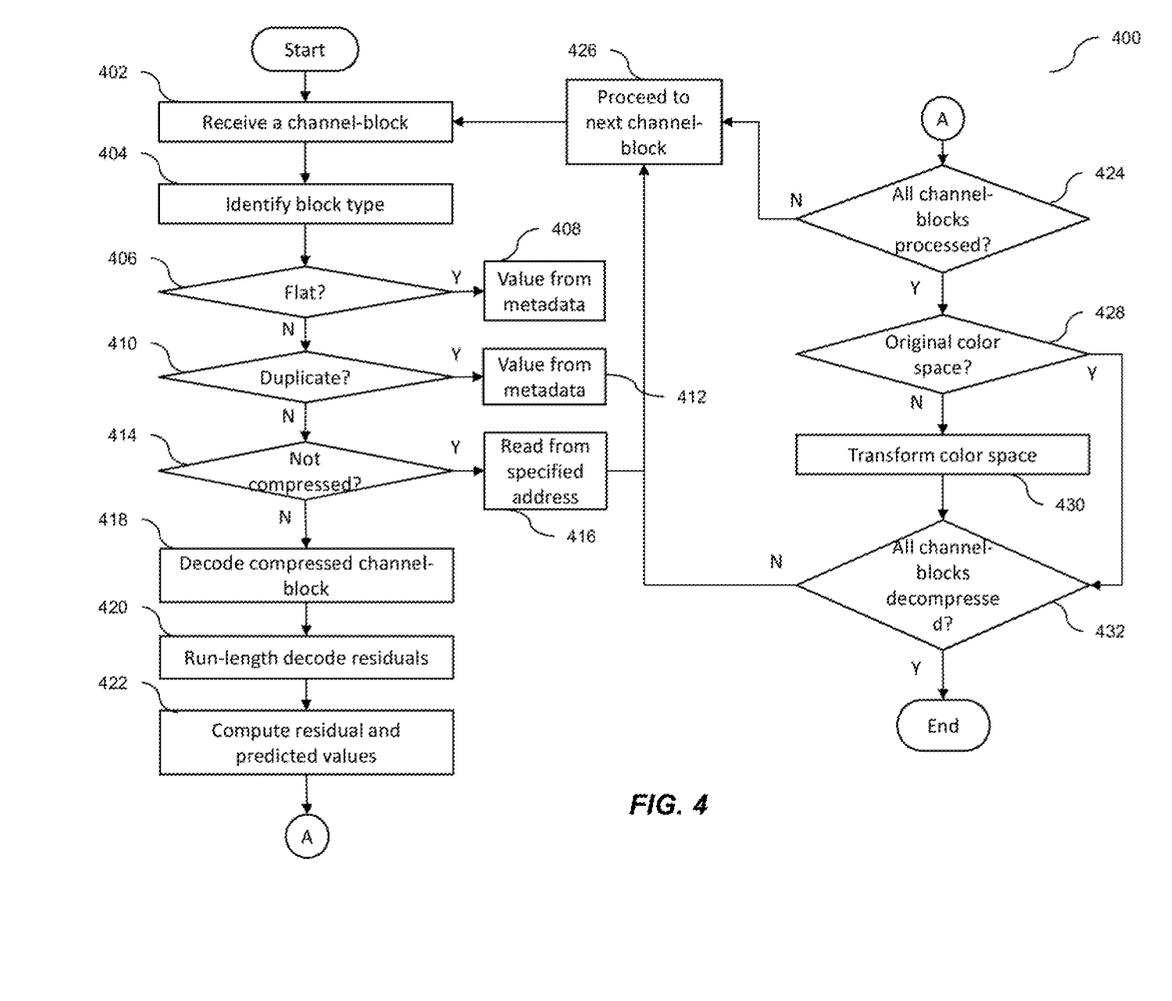
FIG. 4 is a flow diagram illustrating a process of variable rate decompression of a compressed image data in an image pipeline of the graphics processing system, according to some example embodiments of the present disclosure.

While duplicate block factoring (S316 and S318) is illustrated in FIG. 4, in some embodiments of the present disclosure, the compressor 110 does not perform this action (i.e., omits S316 and S318 from block compression S310).

While, in the embodiments of FIG. 4, the color transformation operation (S306 and 308) is performed prior to checking whether the channel-block 204 is flat and/or a duplicate, embodiments of the present invention are not limited thereto. That is, in some embodiments, the compressor 110 first determines whether the channel-block 204 is flat and/duplicate or not (S312, S314, S316, and S318), and if not, then proceeds check if the channel-block 204 is in the target color space or not (S306) and to transform the color space (308) if necessary.

Once flat blocks (and, in some embodiments, duplicate blocks) have been factored out, the compressor 110 compresses the remaining channel-blocks 204 (i.e., unique channel-blocks 204) by utilizing a prediction method to generate residuals for the symbols (S320). In some embodiments, the compressor 110 shapes (e.g., narrows) the distribution of values in a channel-block 204 by exploiting the spatial locality of values in a channel-block 204 to calculate a predicted value x' for every value x based on its neighboring values. For every value x in the channel-block 204, the neighboring values used in the prediction are those that would be decompressed before the value x during decompression. This is done to ensure that during decompression, the right prediction value can be calculated. In some examples, the neighboring values used may be the upper, left, and/or upper-left values. Once the compressor 110 calculates the predicted value x', it stores the residual x–x', which represents the difference between the actual value and the predicted value. When spatial locality is high, this residual modeling may create highly skewed distributions centered at 0, which bear the desirable properties for compression. However, storing residuals may result in an alphabet twice that of the original values. In other words, if x∈[0,M], then x−x'∈[−M,M]. To overcome this effect, the compressor 110 performs a mapping that takes advantage of the fact that the range of possible residuals is limited by the prediction. In some embodiments, the compressor 110 transforms a residual r into the range $$\left[-\frac{M}{2}-1, \frac{M}{2}\right]$$

according to the difference transform D(r), shown in Equation 1:

$$D(r) = \begin{cases} r+M, & r \le -\frac{M}{2} \\ r-M, & r > \frac{M}{2} \\ r & \text{otherwise} \end{cases} \quad (1)$$

where M represents the upper range of possible values in uncompressed channel-block 204. The transformation yields a difference-transformed residual that is narrower (e.g., has less of variance/standard deviation) than that of the unaltered (i.e., the untransformed) residual distribution, and is more suitable for compression. This transformation is desirable as it may compress the range by 1-bit. The range [−M, M] may utilize log 2(M)+1 bits, while the range [−M/2, M/2] may utilize log 2(M) bits only. This may reduce the entropy of the symbol set (described below) and improves the compression limit.

The compressor 110 may utilize any suitable technique for calculating the prediction value x' for a given value of the channel-block 204. In some examples, the compressor 110 may employ block prediction, whereby the predicted value for every value in the channel-block 204 is the value corresponding to the upper-left corner of the channel-block 204. In such examples, the upper left corner itself is stored unfiltered (i.e., without undergoing the difference transform of Equation 1). In some examples, the compressor 110 may employ average prediction, whereby the predicted value for every value in the channel-block 204 is the average of its upper and left neighboring values. In such examples, on edges, an unavailable neighbor is replaced with a copy of the available one (e.g., at the top edge, the left neighbor is used, and at the left edge, the upper neighbor is used), with the upper left corner being stored unfiltered (i.e., without undergoing the difference transform of Equation 1). In other examples, the compressor 110 may also employ differential pulse-code modulation (DPCM), which is used in portable network graphics (PNG), or may employ the LOCO-I (low complexity lossless compression) prediction method, which is used in the JPEG standard. In such examples, the value at the upper left corner of the channel-block 204 is stored unfiltered. According to some examples, the LOCO-I prediction method may outperform other methods by producing residual distributions with relatively low entropy while avoiding (e.g., completely avoiding) overhead.

Once the compressor 110 has completed calculating the residuals of the predictor for each of the values in a channel-block 204, a residual block 206 including all of the residuals is generated. In some embodiments, the compressor 110 then further compresses the residual block 206 with run-length encoding along a planar curve (S322). In so doing, the compressor 110 may take advantage of any runs of data (i.e., sequences in which identical values occur consecutively) that may exist in the residual block 206, which may provide a high level of compression for the values involved.

In some embodiments, the compressor 110 iterates through the values in the residual block 206 in a given order (e.g., a row major, a column major, or z order), which may be referred to as the output stream or write stream, captures where continuous sequences of identical values (e.g., runs) of a particular length (e.g., a particular run length/counter) K (e.g., a length of three) or greater occur, and stores where they start and how long they are.

In some embodiments, after K occurrences of the same value in the output/write stream, the compressor 110 encodes a single-bit signal/flag (also referred to as run-mode flag) in the output stream indicating that the next value in the output stream is a run-length (or an enum). For example, when there are 6 occurrences of the value 15, then for K=3, the encoded output stream may be: 15, 15, 15, 1, 3, where 1 is a 1-bit value, and 3 is a binary value whose bit-width can be different from the bit-width of the value itself. So for example if 15 is an 8-bit value, then the run-length could be 3-bits. However, if the run-length is an enum, which may for example be {1, 2, 4, 8}, then the output stream would be 15, 15, 15, 1, 2, 15 (since 3 is not representable).

In some embodiment, after K occurrences of the same value in the output stream, the compressor 110 encodes a run-length value directly (or an enum of quantized run-length values) which denotes how many additional occurrences of the value should be present in the decoded stream, without adding the single-bit signal/flag. In such embodiments, a run-length of 0 must be encodable. For example, when there are 6 occurrences of the value 15, then for K=3, the encoded output stream may be: 15, 15, 15, 3. However, if the run-length is an enum, which may for example be {0, 2, 4, 8}, then the output stream would be 15, 15, 15, 2, 15 (since 3 is not representable).

Encoding a the single-bit signal/flag allows the penalty of having a run of exactly K being lower than when the signal/flag is not used. For example, if we only had three occurrences of 15, the output would be simply 15, 15, 15, 0 (where '0' is a 1-bit signal) instead of 15, 15, 0 (where the run-length '0' has greater than 1 bit-width), as in the other embodiment.

According to some embodiments, the compressor 110 encodes only those runs that have a length greater than or equal to a threshold length. In some embodiments, the threshold length is three. That is, a run having a length less than the threshold length is not encoded or compressed. This allows the compressor 110 to reduce the overhead involved with encoding run lengths into the stream.

In some embodiments, the run-length encoding operation performed by the compressor 110 may be summarized using the following pseudo code:

```
set run counter to 1
for every value (i):
    compare value to previous value (i−1)
    if equal:
        increment run counter
        if run counter == 3, write run-mode flag
    else:
        if run counter > 2, write the value followed by the
    run-length to the output stream.
```

For example, in a sequence such as WWBBBBBWWWB-WWWW, where W represents a value of 255, and B represents a value of 0, the compressor 110 may write this as WWBBB11WWW0BWWW11 in the output stream, where the underlined number indicates the 1-bit run-mode flag/signal, and any following number is the run-length.

In some embodiments, when identifying runs, the compressor 110 linearizes the values in a residual block 206 (i.e., rearranges the two dimensional arrangement of values in a residual block 206 in a one-dimensional order) by adopting a z-order traversal order, as it allows the linearization to maintain a degree of spatial locality (e.g., identical neighbors may follow block patterns more than row-major patterns), while being less costly to implement in hardware than some other traversal orders. However, embodiments of the present disclosure are not limited thereto, and the compressor 110 may adopt row-major traversal or column-major traversal, in some examples.

While the embodiments illustrated in FIG. 3 apply the run-length encoding (S322) after the residual modeling (S320), embodiments of the present invention are not limited thereto. For example, the compressor 110 may perform run-length encoding on each non-flat, non-duplicate, channel-block 204, and then perform residual modeling on the run-length-encoded blocks. This may be done to reduce the biasing of the residual coding by multiple continuous instances of the same value.

According to some embodiments, the compressor 110 further entropy encodes the write stream (S324) to further improve compression of the image data 200. In some embodiments, entropy encoding is only applied to the residual values in the write stream, and not to the special values such as the run-length and the run-mode flag. However, embodiments of the present invention are not limited thereto, and the entropy coding may apply to the entire write stream including said special values. In some examples, the compressor 110 employs arithmetic coding for entropy encoding the residual values in the write stream, as the performance of arithmetic coding can be arbitrarily close to entropy with increasing sequence length and the relative regularity of residual distributions across channels. However, embodiments of the present disclosure are not limited thereto, and entropy encoding may be performed using any suitable lossless encoding scheme, such as golomb coding, huffman coding, or the like.

At times, it may be possible for a particular compressed channel-block 208 (e.g., one containing high frequency component data) to occupy a greater number of bits than the original uncompressed channel-block 204. As such, in some embodiments, the compressor 110 compares the length (e.g., calculated length) of the compressed channel-block 208 with that of the uncompressed channel-block 204 to determine whether the compression results in a bit saving (S326). If the compressed length is less than the original uncompressed length, the compressor stores the compressed entropy-encoded residual data as the compressed channel-block 208 and generates/updates the corresponding metadata 210 to indicate the block type as compressed (by, e.g., appropriately setting a block type flag in the metadata). However, if the compressed length is greater than or equal to the original uncompressed length, the compressor 110 labels the channel-block 204 as uncompressed, and passes through the uncompressed channel-block 204 without any compression. In some examples, the compressor 110 saves/stores the uncompressed channel-block 204 as the compressed channel-block 208 and updates the corresponding metadata 210 to indicate the block type as uncompressed (by, e.g., appropriately setting a block type flag in the metadata).

According to some examples, the compressor 110 may not necessarily wait until after entropy encoding to check compression length (or the length of the write stream) and may perform this check at any other point, or at multiple points, during block compression (S310).

The compressor 110 then determines whether all blocks 202 (e.g., all channel-blocks 204) have been compressed (S328). If not, the compressor 110 proceeds to the next block 202 (e.g., the next channel-block 204) (S330) and begins the process a new (at S312).

Once compression of the image data 200 is complete, it may be stored in the cache 14. The graphics processing system 10 can retrieve the cached image data by decompressing the compressed image data via the decompressor 120.

FIG. 4 is a flow diagram illustrating a process 400 of variable rate decompression of a compressed image data in an image pipeline of the graphics processing system 10, according to some example embodiments of the present disclosure.

According to some embodiments, the decompressor 120 retrieves the stored image data from (e.g., decompresses the stored channel-blocks 208 stored in) the memory/cache 14 by retrieving and decompressing each of the blocks 202 that make up the image data 200. In so doing the decompressor 120 decompresses each of the stored channel-blocks 208 individually and reconstructs the original image data 200 by realigning the uncompressed blocks 202 and in some examples, transforming the color space to a desired color space (e.g., the color space of the original uncompressed image data 200).

In some embodiments, the decompressor 120 retrieves a stored channel-block 208 and the associated block metadata 210 (S402). The decompressor 120 then identifies the block type, as either flat/constant, duplicate, compressed, or uncompressed (S404). In some examples, the decompressor 120 may identify the block type by reading a block type flag from the corresponding block metadata 210.

If the block type is identified as flat/constant (S406), the decompressor 120 reads the color value (e.g., RGBA value) from the corresponding metadata into the entire block (e.g., channel-block 204) (S408). That is, the color value is applied to each value element in the block (e.g., the channel-block 204).

If the block type is identified as a duplicate of a previously decompressed block (S410), the decompressor 120 reads the same compressed data for all duplicate blocks and decompresses the data. This is due to the fact that each duplicate of a block is encoded in metadata to have the same pointer to compressed data, if not flat. In some embodiments, the decompressor 120 only decompresses the duplicate blocks once, and uses the same decompressed data for all duplicate blocks.

If the block is identified as uncompressed (S414), the decompressor 120 reads the uncompressed block starting at a specific start address (S416) stored in the corresponding metadata. The decompressor 120 then proceeds to the next block 202 (e.g., the next channel-block 204) (S426) and begins the process a new (at S402).

Else (if the block type is identified as compressed), according to some embodiments, the decompressor 120 begins decompression (S418) by reading the cached block (e.g., the compressed channel-block 208) starting at an address offset specified in the metadata. The decompressor 120 then, in the reverse run-order utilized during compression (e.g., z-order traversal or row-order traversal), decodes the residuals values (S418) according to the encoding scheme employed during compression (e.g., arithmetic, huffman, or golomb coding).

The decompressor 120 performs run-length decoding of the recovered values by comparing consecutive values with one another (S420). According to some embodiments, when a value (i, where i is an integer greater than 1) is equal to its previous (i.e., immediately preceding) two values (i−1) and (i−2), the decompressor 120 reads the run-mode flag, which is either true or false. If true, the decompressor 120 reads the quantized run length n (where n is a positive integer) and copies the previous value (i−1) into n values following the previous value (i−1). If the run-mode flag is false, the decompressor 120 proceeds to the next value (i+1). The decompressor 120 continues this comparison until the channel-block 204 is complete.

In some embodiments, the decompressor 120 then computes the predicted value according to a prediction scheme utilized during the compression process and adds the decoded residuals to the predictor to recover the original value (S422). In embodiments in which the compressor 110 performs the mapping of Equation 1 during compression, the decompressor 120 may recover the original value x based on Equation 2:

$$x=(x'+D(r))\%M \qquad (2)$$

where x' represents the predicted value, M represents the upper range of possible values in uncompressed channel-block 204, r represents a difference-transformed residual, D(r) is defined by Equation 1, and % M represents an integer modulo to keep the results within the log 2(M) bit range.

While the embodiments illustrated in FIG. 4 apply the run-length decoding (S420) before the residual modeling (S422), embodiments of the present invention are not limited thereto, and the order of these two processes may be reversed. For example, in embodiments in which the compressor 110 performs run-length encoding prior to residual coding during compression, the decompressor 120 may perform residual modeling (i.e., computing residual and predicted values; S422) prior to run-length decoding (S420). This particular order may reduce the biasing of the residual coding by multiple continuous instances of the same value.

The decompressor 120 then checks whether all of the channel-blocks 204 (e.g., the Y, Cr, and Cb channel-blocks 204) corresponding to the same block 202, which is associated with the channel-block 204 that was just processed, have been decompressed or not (S424). If not, the decompressor 120 then proceeds to the next block 202 (e.g., the next channel-block 204) (S426) and begins the process a new (at S402).

In some embodiments, if all of the channel-blocks 204 (e.g., the Y, Cr, and Cb channel-blocks 204) corresponding to the same block 202 have been processed, the decompressor 120 then checks whether the corresponding channel-blocks 204 are in the desired color space (i.e., the color space of the original image data 200) or not (S428). If the color space is not in the desired color space, the decompressor 120 transforms the color space of the uncompressed channel-block 204 to the desired color space (e.g., RGB) (S430).

If all compressed channel-blocks 208 have not been decompressed (S432), the decompressor proceeds to the next channel-block (S426).

The decompressor 120 may then reconstruct the original image data 200 by decompressing all blocks 202 according to process 400.

While the process 400 illustrated in FIG. 4 shows the processes S406, S410, and S414 being performed in a particular order, embodiments of the present disclosure are not limited thereto, and the processes S406, S410, and S414 may be reordered in any suitable manner.

Accordingly, as described above, the compression system, according to some embodiments of the present disclosure, provides a simple and cost-effective, yet flexible, implementation of lossless image compression and decompression that may readily be adopted in any suitable system (such as a GPU, CPU, a graphics processing system having a camera, etc.). Some embodiments of the present disclosure employ several compression techniques to reduce redundancy in image data and to encode what remains close to entropy (e.g., as close to entropy as possible). Thus, the lossless compression, according to embodiments of the present invention, is capable of achieving a compression ratio that is greater than that of the lossless compression techniques of the related art.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The compression system and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the compression system may be implemented on a flexible printed circuit film, a tape carrier package (TCP), a printed circuit board (PCB), or formed on the same substrate. Further, the various components of the compression system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of variable rate compression of image data in an image pipeline of a graphics processing system, the method comprising:
partitioning, by a processor of the graphics processing system, the image data into a plurality of blocks, each block of the plurality of blocks comprising a plurality of channel-blocks corresponding to color channels of a color space of the block;
identifying, by the processor, one or more non-flat channel-blocks of the plurality of channel-blocks; and
for one of the one or more non-flat channel-blocks:
generating, by the processor, a residual block comprising residual values corresponding to values of the one of the one or more non-flat channel-blocks;
determining, by the processor, whether each of the residual values is equal to a previous residual value or not;
initiating a run counter;
in response to the determining that a particular residual value of the residual values is equal to a corresponding previous residual value:
incrementing the run counter; and
in response to determining that the run counter is greater than a threshold, generating, by the processor, a run-mode flag and writing the run-mode flag after the particular residual value in a compressed output stream;
in response to determining that the particular residual value is not equal to a corresponding previous value:
in response to the determining that the run counter is greater than the threshold, generating, by the processor, a run-length after the run-mode flag in the compressed output stream, the run-length corresponding to the run counter; and
encoding, by the processor, the compressed output stream to generate a compressed channel-block.

2. The method of claim 1, wherein the threshold is two.

3. The method of claim 1, wherein the run-length is equal to the run counter or a quantized value corresponding to the run counter.

4. The method of claim 1, wherein the plurality of blocks comprises aligned blocks, each of the blocks comprising a k×l block of pixels of the image data, where k and l are integers greater than 1.

5. The method of claim 1, further comprising transforming, by the processor, a color space of each block of the plurality of blocks to a target color space.

6. The method of claim 5, wherein the color space of each block of the plurality of blocks is an RGB (red, green, and blue) color space, and the target color space is a YCbCr (luma component 'Y', blue-difference chroma component 'Cb', and red-difference chroma component 'Cr') color space, and
wherein the plurality of channel-blocks comprises a first channel-block corresponding to a Y color channel, a second channel-block corresponding to a Cb color channel, and a third channel-block corresponding to a Cr color channel.

7. The method of claim 1, wherein each of the one or more non-flat channel-blocks comprises at least two pixels with different color values.

8. The method of claim 1, wherein the generating the residual block comprises:
determining, by the processor, prediction values for the values of the one of the one or more non-flat channel-blocks using a prediction method; and
determining, by the processor, the residual values based on the prediction values and the values of the one of the one or more non-flat channel-blocks to generate the residual block.

9. The method of claim 8, wherein the prediction method comprises an average prediction method, a differential pulse-code modulation (DPCM) method, or a low complexity lossless compression (LOCO-I) prediction method.

10. The method of claim 1, wherein the run-mode flag is a binary value indicating that the run counter exceeds the threshold.

11. The method of claim 1, further comprises:
comparing, by the processor, a size of the compressed channel-block with a size of the one of the one or more non-flat channel-blocks; and
in response to determining that the size of the compressed channel-block is equal to or greater than the size of the one of the one or more non-flat channel-blocks, updating, by the processor, a metadata associated with the one of the one or more non-flat channel-blocks to indicate that the one of the one or more non-flat channel-blocks is uncompressible.

12. The method of claim 1, further comprising:
identifying, by the processor, one or more flat channel-blocks of the plurality of channel-blocks, each of the one or more flat channel-blocks comprising pixels having a same color value; and
compressing, by the processor, the one or more flat channel-blocks by storing a color value of each of the one or more flat channel-blocks in an associated metadata.

13. The method of claim 1, further comprising:
identifying, by the processor, a plurality of duplicate channel-blocks of the plurality of channel-blocks, the plurality of duplicate channel-blocks comprising a first duplicate channel-block; and
compressing, by the processor, the duplicate channel-blocks by storing a pointer to the first duplicate channel-block in metadata associated with ones of the duplicate channel-blocks other than the first duplicate channel-block.

14. The method of claim 13, wherein the identifying the plurality of duplicate channel-blocks comprises:
maintaining, by the processor, a sliding window of channel-blocks of the plurality of channel-blocks; and
comparing, by the processor, one of the plurality of channel-blocks with ones of the sliding window of channel-blocks to identify a match.

15. The method of claim 14, wherein the encoding the compressed output stream comprises encoding the compressed output stream with arithmetic encoding, huffman encoding, or golomb encoding to generate the compressed channel-block.

16. A graphics processing system for variable rate compression of image data in an image pipeline, the system comprising:
a processor; and
a processor memory local to the processor, wherein the processor memory has stored thereon instructions that, when executed by the processor, cause the processor to perform:
partitioning the image data into a plurality of blocks, each block of the plurality of blocks comprising a plurality of channel-blocks corresponding to color channels of a color space of the block;
identifying one or more non-flat channel-blocks of the plurality of channel-blocks; and
for one of the one or more non-flat channel-blocks:
generating a residual block comprising residual values corresponding to values of the one of the one or more non-flat channel-blocks;
determining whether each of the residual values is equal to a previous residual value or not;
initiating a run counter;
in response to the determining that a particular residual value of the residual values is equal to a corresponding previous residual value:
incrementing the run counter; and
in response to determining that the run counter is greater than a threshold, generating a run-mode flag and writing the run-mode flag after the particular residual value in a compressed output stream;
in response to the determining that the particular residual value is not equal to a corresponding previous value:
in response to the determining that the run counter is greater than the threshold, generating writing a run-length after the run-mode flag in the compressed output stream, the run-length corresponding to the run counter; and
encoding the compressed output stream to generate a compressed channel-block.

17. A method of variable rate compression of image data in an image pipeline of a graphics processing system, the method comprising:
partitioning, by a processor of the graphics processing system, the image data into a plurality of blocks, each block of the plurality of blocks comprising a plurality of channel-blocks corresponding to color channels of a color space of the block;
identifying, by the processor, one or more non-flat channel-blocks of the plurality of channel-blocks, one of the one or more non-flat channel-blocks comprising a plurality of values; and
for the one of the one or more non-flat channel-blocks:
determining, by the processor, whether each one of the plurality of values is equal to a previous value of the plurality of values or not;
initiating a run counter;
in response to the determining that a particular value of the plurality of values is equal to a corresponding previous value:
incrementing the run counter; and
in response to determining that the run counter is greater than a threshold, generating, by the processor, a run-mode flag and writing the run-mode flag after the particular value in a compressed output stream;
in response to the determining that the particular value is not equal to a corresponding previous value:
in response to the determining that the run counter is greater than the threshold, generating, by the processor, a run-length after the run-mode flag in the compressed output stream, the run-length corresponding to the run counter; and
generating, by the processor, a residual block comprising residual values corresponding to values of the compressed output stream;
encoding, by the processor, the residual block to generate a compressed channel-block.

18. A method of variable rate decompression of image data in an image pipeline of a graphics processing system, the method comprising:
retrieving, by a processor of the graphics processing system, a stored channel-block associated with the image data;
identifying, by the processor, the stored channel-block as compressed, uncompressed, or flat; and
in response to identifying the stored channel-block as compressed:
decoding, by the processor, the stored channel-block according to an encoding scheme to generate a residual block comprising residual values;
determining, by the processor, whether each of the residual values is equal to a plurality of previous residual values or not;
in response to the determining that a particular residual value of the residual values is equal to the plurality of previous residual values:
identifying, by the processor, a run-mode flag associated with the particular residual value; and
in response to determining that the run-mode flag is true:
retrieving, by the processor, a run length; and
copying, by the processor, one of the plurality of previous residual values into a number of values in a write stream following a corresponding previous residual value, the number of values corresponding to the run length, the write stream comprising a plurality of run-length decoded residual values; and
generating, by the processor, an uncompressed channel-block associated with the image data based on the write stream.

19. The method of claim 18, further comprising:
determining, by the processor, predicted values based on the run-length decoded residual values according to a prediction scheme;
determining original values based on the predicted values and the residual values, and
wherein the generating the uncompressed channel-block is based on the original values.

20. The method of claim 19, wherein the prediction scheme comprises an average prediction method, a differential pulse-code modulation (DPCM) method, or a low complexity lossless compression (LOCO-I) prediction method.

21. The method of claim 18, wherein the stored channel-block comprises color values of a channel of a k×l block of pixels of the image data, where k and l are integers greater than 1, and wherein the plurality of previous residual values comprises two or more previous residual values.

22. The method of claim 18, wherein the encoding scheme comprises arithmetic encoding, huffman encoding, or golomb encoding.

23. The method of claim 18, wherein the run-mode flag is a binary value indicating that a run counter exceeds a threshold.

24. The method of claim 18, further comprising transforming, by the processor, a color space of the uncompressed channel-block a target color space.

* * * * *